(12) United States Patent
Ishiguro et al.

(10) Patent No.: US 6,893,351 B2
(45) Date of Patent: May 17, 2005

(54) TRIPOD TYPE CONSTANT VELOCITY UNIVERSAL JOINT

(75) Inventors: Shigeyoshi Ishiguro, Shizuoka-ken (JP); Tatsuro Sugiyama, Shizuoka-ken (JP); Haruo Nagatani, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/907,967

(22) Filed: Jul. 19, 2001

(65) Prior Publication Data

US 2002/0028711 A1 Mar. 7, 2002

(30) Foreign Application Priority Data

Aug. 11, 2000  (JP) ........................................ 2000-244462

(51) Int. Cl.⁷ ............................................... F16D 3/205
(52) U.S. Cl. ........................ 464/111; 464/905; 464/124
(58) Field of Search ................................ 464/111, 124, 464/120, 122, 123, 132, 905, 11, 115, 121; 403/125, 126, 133, 135; 384/49

(56) References Cited

U.S. PATENT DOCUMENTS

| 4,167,860 A | * | 9/1979 | Sakaguchi et al. ............ 464/15 |
| 4,810,232 A | | 3/1989 | Farrell et al. |
| 5,391,013 A | * | 2/1995 | Ricks et al. ................. 464/111 |
| 5,474,500 A | * | 12/1995 | Girguis ........................ 464/111 |
| 5,989,124 A | * | 11/1999 | Goto et al. ................... 464/111 |
| 6,010,420 A | * | 1/2000 | Niki et al. ................... 474/199 |
| 6,322,453 B1 | * | 11/2001 | Ishiguro et al. ............. 464/111 |

FOREIGN PATENT DOCUMENTS

| DE | 39 36 603 A1 | 5/1991 |
| FR | 2 586 767 | 9/1986 |
| FR | 2 672 092 | 1/1992 |

* cited by examiner

*Primary Examiner*—Kenneth Thompson
(74) *Attorney, Agent, or Firm*—Arent Fox PLLC

(57) ABSTRACT

A tripod type constant velocity universal joint of a single roller type is provided, which can be used in a vehicle operating at high angles without causing an increase in costs by lowering the level of vibration even at a high operating angle. A tripod type constant velocity universal joint is composed of an outer joint member with three track grooves, extending in its axial direction, on the inner circumferential surface of the outer joint member, a tripod member with three radially projecting leg shafts around the circumference of the tripod member, and rotatable rollers mounted on each leg shaft through a plurality of needle rollers and positioned in the track grooves of the outer joint member, the outer circumferential surfaces of the rollers being guided by roller guide surfaces provided on both sides of the track grooves. In this construction, grooves extending along the track grooves are provided on the roller guide surfaces where the rollers contact.

22 Claims, 9 Drawing Sheets

TRIPOD TYPE CONSTANT VELOCITY UNIVERSAL JOINT

BACKGROUND OF THE INVENTION

1. Field of the Invention

The present invention relates to a tripod type constant velocity universal joint used in a power transmitting section of automobiles, aircraft, ships, and industrial machinery.

2. Description of the Related Art

For example, among constant velocity universal joints used as means for transmitting a rotational power of an automobile engine to its wheels at a constant speed is a tripod type constant velocity joint. This tripod type constant velocity universal joint connects a driving side shaft and a driven side shaft together and can transmit a rotational torque between them at a constant velocity even if there is an operating angle between them. The tripod type constant velocity universal joint even permits a relative displacement in an axial direction.

FIG. 15 and FIG. 16 show a fundamental structure of a tripod type constant velocity universal joint. This constant velocity universal joint is composed of, as essential structural members, a tripod member 2 with three radially projecting leg shafts 1, an outer joint member 5 with three axially extending track grooves 3 formed on the inner circumferential surface of the outer joint member, and rollers 7. Each of the track grooves 3 has at both sides axially extending roller guide surfaces 4. The rollers 7 are mounted on the leg shafts 1 of the tripod member 2 through a plurality of needle rollers 6 and positioned in the track grooves 3 of the outer joint member. The rollers 7 are guided on their external circumferential surfaces by the roller guide surfaces 4 provided at the both sides of the track grooves.

The tripod member 2 is fitted over a serration part (or spline part) formed on an end part of the other shaft, not shown, and is secured. As shown in FIG. 17, a plurality of the needle rollers 6 are arranged, so that they can rotate, on an outer circumferential surface of the leg shaft 1 of the tripod member 2. The needle rollers 6 are limited with respect to their displacement on the leg shaft 1 in the axial direction by washers 8 and 9 installed at the base and top parts of the leg shaft 1, and a retaining ring 10 secured at the top part of the leg shaft 1. The outer circumferential surface of the leg shaft 1 of the tripod member 2 has a cylindrical shape, and rollers 7 are fitted over the outer circumferential surface of the leg shaft 1 through the needle rollers 6 so that they can rotate. The inner circumferential surface of the roller 7 has a cylindrical shape and the outer surface thereof has a genuine partial sphere shape.

The outer joint member 5 forms a cylindrical cup with one end open and the other end closed, with the other shaft, not shown, being integrally provided at the other end of the outer joint member. Three axial track grooves 3 are formed on the circumference around a center shaft at intervals of 120 degrees on the inner circumferential surface of the outer joint member 5. At both sides of each track groove 3 are the two roller guide surfaces 4, and, as shown in FIG. 18, the roller guide surface 4 makes angular contact with the roller 7 at two points A and B. This is done by forming the roller guide surface 4 in the shape of a gothic arch.

In this tripod type constant velocity universal joint, power is transmitted by the connection between the roller guide surfaces 4 of the outer joint member 5 and the rollers 7 of the tripod member 2. The rollers 7 absorb plunging by rotating along the roller guide surfaces 4. In the case of power transmission when the axis of the outer joint member 5 and the axis of the tripod member 2 are aligned, or an operating angle is 0 degree, the point of intersection of the axes of each leg shaft 1 is located on the axis of the outer joint member 5. In this way the rollers 7 rotate while maintaining dual contact points with the roller guide surfaces 4. When there is an operating angle, although the magnitude of the contact force fluctuates depending on the rotational phase, the operation of the tripod type constant velocity universal joint is stable because the rollers and the roller guide surfaces 4 are always in contact with each other at the two points A and B.

The tripod type constant velocity universal joint described above is a sliding type in which relative displacement, caused by plunging, between the two shafts in the axial direction is allowed. Torque is transmitted by connecting the tripod member 2 with one shaft, connecting the outer joint member 5 with the other shaft, and positioning the leg shafts 1 of the tripod member 2 in the track grooves 3 of the outer joint member 5. In this construction, the tripod member 2 is provided with the three leg shafts 1 projecting in an axial direction, and the outer joint member 5 is provided with the three track grooves 3 extending in the axial direction.

In this tripod type constant velocity universal joint, because the roller 7 and the roller guide surface 4 are in angular contact at the points A and B, and the roller 7 does not contact with the center part and both sides of the roller guide surface 4, a strong edge load is not created, the needle rollers 6 do not become skew, and friction resistance does not increase. Furthermore, because of lower eccentric load, rotational moment caused in the roller 7 acting at a right angle to the leg shaft 1 around the axis thereof can be decreased, and frictional force and induced thrust that cause vibration can be reduced. Also, movement in the axial direction when transmitting rotational torque with an operating angle becomes smooth, so that induced thrust is reduced.

However, conventional tripod type constant velocity universal joints are usually mounted on vehicles operating at low angles, for example equal to or less than 4 degrees, and for vehicles operating at high angles, for example equal to or more than 7 degrees, tripod type constant velocity universal joints of a double roller type are used taking into consideration a higher level of vibration in such applications. The conventional tripod type constant velocity universal joints described above correspond to a single roller type.

A tripod type constant velocity universal joint of a double roller type is provided with a roller assembly each contained as a unit. The roller assembly is composed of a circular inner roller which is fitted over the outer circumferential surface of a leg shaft, and an outer roller positioned within the track groove which rotates in the axial direction of an outer joint member. Needle rollers are interposed between the inner and outer rollers. Within the roller assembly the inner and outer rollers are individually rotatable.

In this tripod type constant velocity universal joint, the roller assembly composed of the inner and outer rollers can swing freely with respect to the leg shaft. Therefore, when transmitting a rotational force at a high operating angle between the outer joint member and the tripod member, the roller assembly can rotate only in the axial direction of the outer joint member, and the vibration inducing force of the outer joint member can be absorbed by the rotation of the needle rollers, so that sliding resistance can be reduced.

Furthermore, the moment acting to incline the roller assembly during operation becomes smaller, the roller assembly can maintain its posture, resistance between the outer joint member and the roller assembly during rotation becomes smaller, and induced thrust can be reduced.

However, because a tripod type constant velocity universal joint of a double roller type has a structure provided with the roller assemblies composed of inner and outer rollers, using a tripod type constant velocity universal joint of this type in a vehicle which operates at a low angle causes the cost to increase.

SUMMARY OF THE INVENTION

An object of the present invention is to enable the use of a tripod type constant velocity universal joint in vehicles operating at high angles, without causing an increase in costs, by reducing the level of vibration even at high operating angles.

A tripod type constant velocity universal joint in accordance with the present invention is composed of an outer joint member with three track grooves, which extend in its axial direction around the circumference, on the inner surface of the outer joint member, and a tripod member with three radially projecting leg shafts around the circumference of the tripod member. Rollers are mounted on each leg shaft, so that they can rotate, through a plurality of needle rollers, and positioned in the track grooves of the outer joint member. The rollers are guided at their outer circumferential surfaces by roller guide surfaces provided on both sides of the track grooves. In this construction, grooves extending along the track grooves are formed on the roller guide surfaces at the points where the rollers contact.

In a tripod type constant velocity universal joint in accordance with the present invention, because the grooves extending along the track grooves are formed on the roller guide surfaces at the points where the rollers contact, the grooves formed on the roller guide surfaces function as pockets for grease supplied inside the constant velocity universal joint. By the grease in the pockets improves the lubrication, the sliding resistance and induced thrust between the roller guide surfaces and the rollers are reduced, so that the level of vibration is lowered. As a result, the level of vibration can be reduced in a tripod type constant velocity universal joint of a single roller type even when operating at high angles. In this way it becomes possible to use the joint in a vehicle operating at high angles without causing an increase in costs.

To achieve this lowered level of vibration, it is preferable that the following are added to the structure of the tripod type constant velocity universal joint:

1. Clearance between the outer circumferential surface of the roller and the track groove is widened by an amount equal to a reduction in the clearance caused by inclination of the roller. The widening is achieved by making the outer circumferential surface of the roller in a spherical shape, and making the outer circumferential surface of the roller in cross section an arc shape with its center of curvature shifted radially outward from the axis of the roller.

2. The roller guide surface and the roller are in angular contact at two points.

3. The outer circumferential surface of the leg shaft is crowned.

4. The inner circumferential surface of the roller is crowned.

5. The outer circumferential surface of the leg shaft is formed in an elliptical cylinder shape in the embodiments of FIG. 1 and FIG. 3.

6. The ends of the needle roller are formed in a convex shape.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Figure 1:
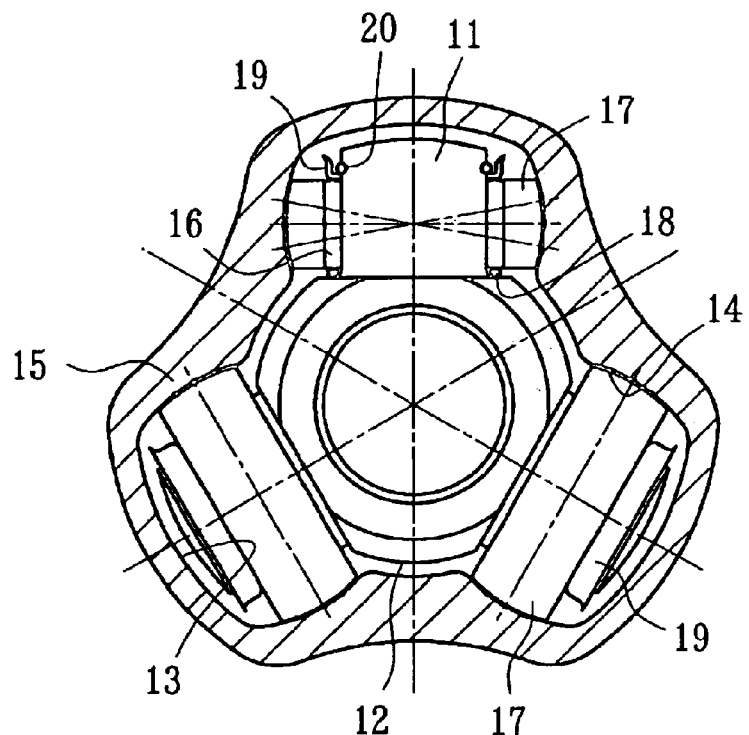
FIG. 1 shows a cross sectional view of a tripod type constant velocity universal joint in accordance with an embodiment of the present invention with oil grooves formed on roller guide surfaces.

An embodiment shown in FIG. 1 is a tripod type constant velocity universal joint of a single roller type. This constant velocity universal joint is composed of, as essential structural members, a tripod member 12 with three radially extending leg shafts 11, an outer joint member 15 with three axially extending track grooves 13 formed on the inner circumferential surface of the outer joint member, and rollers 17. Each of the track groove 13 have, at both sides, axially extending roller guide surfaces 14. The rollers 17 are mounted on the leg shafts 11 of the tripod member 12 through a plurality of needle rollers 16 and positioned in the track grooves 13 of the outer joint member 15. The rollers 17 are guided on their external circumferential surfaces by the roller guide surfaces 14 provided at both sides of each of the track grooves.

The tripod member 12 is fitted over a serration part (or spline part) formed on an end part of the other shaft, not shown, and is secured. A plurality of the needle rollers 16 are mounted on the circumferential surface of the leg shaft 11 of the tripod member 12 so that they can rotate. The displacement of the needle rollers 16 on the leg shaft 11 is limited in an axial direction by washers 18 and 19, installed at a base and top part of the leg shaft 11, and retaining ring 20 installed on a top part of the leg shaft 11.

Figure 2:
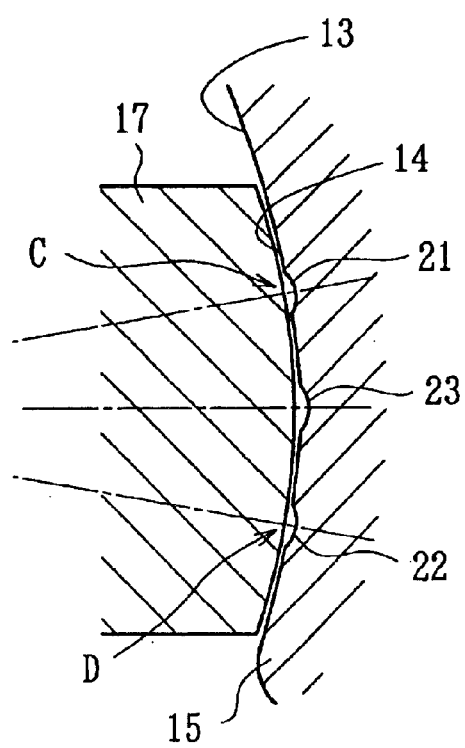
FIG. 2 is an enlarged cross sectional view of an essential part showing a roller and a roller guide surface of the embodiment presented in FIG. 1.

The outer joint member 15 forms a substantial cylindrical cup with one end open and the other end closed. The other shaft, not shown, is integrally provided at the other end of the outer joint member, and three axial track grooves 13 are formed on the circumference around a center shaft at intervals of 120 degrees. At the both sides of each track groove 13 are the two roller guide surfaces 14, and, as shown in FIG. 2, the roller guide surface is in angular contact with the roller 17 at two points C and D by forming the roller guide surface 14 in the shape of a gothic arch.

In this tripod type constant velocity universal joint, power is transmitted by the connection of the roller guide surfaces 14 of the outer joint member 15 with the rollers 17 of the tripod member 12. The rollers 17 absorb plunging by rotating along the roller guide surfaces 14.

In the case of transmission when the axis of the outer joint member 15 and the axis of the tripod member 12 are aligned, or when an operating angle is 0 degrees, the point of intersection of the axes of each leg shaft 11 is located on the axis of the outer joint member 15. In this way the rollers 17 rotate while maintaining dual contact points with the roller guide surfaces 14. When there is an operating angle, although the magnitude of the contact force fluctuates depending on the rotational phase, the operation of the tripod type constant velocity universal joint is stable because the rollers 17 and the roller guide surfaces 14 are always in contact with each other at the two points C and D. In this embodiment, grooves 21 and 22 extending along the track grooves 13 are formed on the two contact points C and D on the roller guide surface that is in contact with the roller 17, and at the same time a groove 23 extending along each of the track grooves 13 is formed on the intermediate part between the contact points C and D.

The grooves 21 to 23 formed on the roller guide surface 14 function as pockets for grease supplied inside the constant velocity universal joint. The grease in the pockets improves the lubrication and consequently the induced thrust can be reduced. The term "induced thrust" means thrust force produced by friction inside a constant velocity universal joint when torque is applied to this joint rotating at a certain operating angle. In a tripod type joint induced thrust appears mainly as a strong tertiary component.

Figure 3:
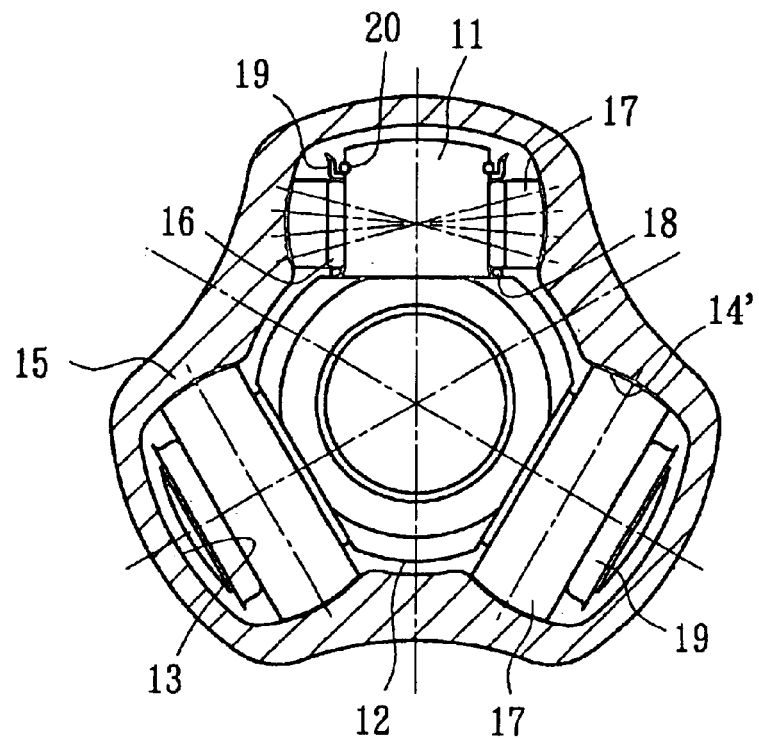
FIG. 3 shows a cross sectional view of a tripod type constant velocity universal joint in accordance with another embodiment of the present invention with roller guide surfaces in cross section forming a polygon shape.
Figure 4:
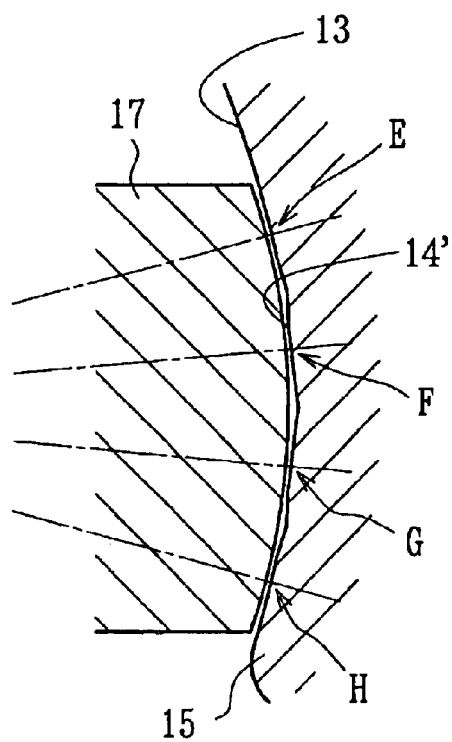
FIG. 4 is an enlarged cross sectional view of an essential part showing a roller and a roller guide surface of the embodiment presented in FIG. 3.

In the embodiment shown in FIG. 1 and FIG. 2, the roller guide surface 14 is provided with the grooves 21 to 23. However, a structure shown in FIG. 3 and FIG. 4 is also possible. In the embodiment shown in FIG. 3 and FIG. 4, a roller guide surface 14' in cross section forms a polygon shape and the roller 17 makes contact with the roller guide surface at the four points E to H. Clearance formed between each of the four contact points E to H serves, in the same way as the grooves of 21 to 23 described above, as pockets for grease supplied inside the constant velocity universal joint.

Figure 5:
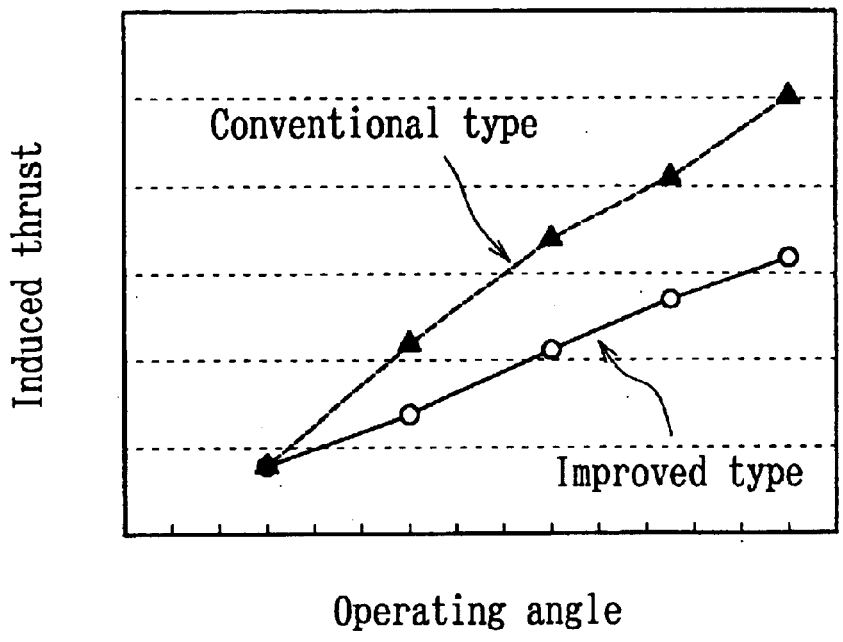
FIG. 5 is a characteristics diagram showing the relationship between induced thrust and operating angles.

In the embodiments shown in FIG. 1 to FIG. 4, when a conventional type and an improved type (in accordance with the embodiments) are compared as shown in FIG. 5, the improved type has less induced thrust than the conventional type even with larger operating angles. Consequently the improved type can be used for vehicles operating at higher angles.

Figure 6:
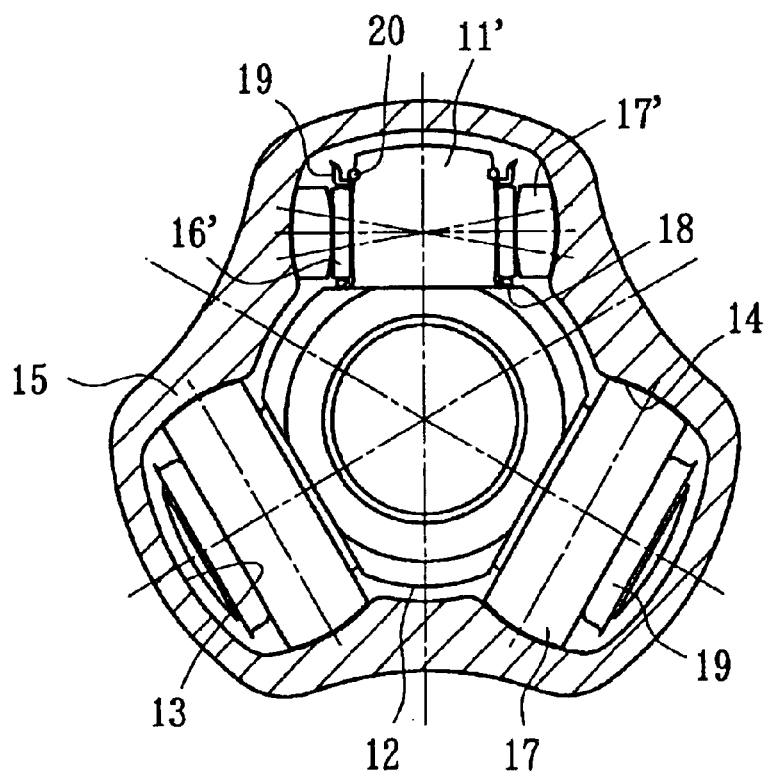
FIG. 6 is another embodiment of the present invention, showing a tripod type constant velocity universal joint with the outer circumferential surfaces of the leg shafts and inner circumferential surfaces of the rollers crowned, and both ends of the needle rollers formed in a convex shape.
Figure 7:
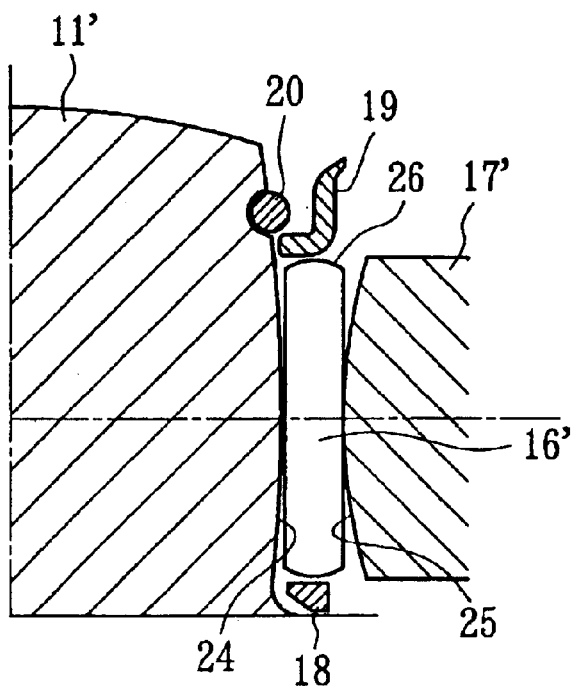
FIG. 7 is an enlarged cross sectional view of an essential part showing a leg shaft, a needle roller and a roller of the embodiment in FIG. 6.

FIG. 6 and FIG. 7 show an embodiment in which an outer circumferential surface 24 of the leg shaft 11' of the tripod member 12 and on an inner circumferential surface 25 of a roller 17' are crowned.

Crowning the outer circumferential surface 24 of the leg shaft 11' and the inner circumferential surface 25 of the roller 17' increases mutual freedom of movement of the leg shaft 11' and the roller 17' (needle rollers 16' exist between the two) so that the level of vibration can be reduced. This means that the roller 17' is in parallel with track groove 13 as much as possible when it moves, with a reduced inclination, even when there is an operating angle, and as a result the level of vibration can be reduced.

In the embodiment shown in FIG. 6 and FIG. 7, both the outer circumferential surface 24 of the leg shaft 11' and inner circumferential surface 25 of the roller 17' are crowned. However, a reduction in the level of vibration can be obtained by crowning either of the outer circumferential surface 24 of the leg shaft 11' or the inner circumferential surface 25 of the roller 17'.

Crowning in the range R89 to R700 on the outer circumferential surface 24 of the leg shaft 11' is preferred, and in the range R50 to R800 on the inner circumferential surface 25 of the roller 17' is preferred. Crowning below R89 and R50 causes the surface pressure to become too high, which causes a shorter lifetime of the joint in a load endurance test and lowers durability. Contrary to this, when the crowning is larger than R700 and R800 it becomes difficult to obtain a reduction in induced thrust. This means that a reduction of 5% or less in induced thrust is only within an allowance, and the desired reduction cannot be obtained.

In the preferred crowning range on the outer circumferential surface 24 of the leg shaft 11', which is from R89 to R700, the ratio of the crowning R to the outer diameter d of the leg shaft 11' becomes R/d=5.0 to 39.3. In the preferred crowning range on the inner circumferential surface 25 of the roller 17', which is from R50 to R800, the ratio of the crowning R to the inner diameter D of the roller 17' becomes R/d=2.2 to 35.2.

In order to further reduce the level of vibration, it is preferable that the ends 26 of needle rollers 16', provided between the roller guide surface 14 and the roller 17', are formed in a convex shape. A convex shape on the ends 26 of the needle rollers 16' helps reduce sliding resistance and induced thrust. The term "sliding resistance" means the magnitude of axial friction force that occurs when an outer joint member and a shaft mutually slide in a sliding type joint such as a tripod type constant velocity joint.

Figure 8:
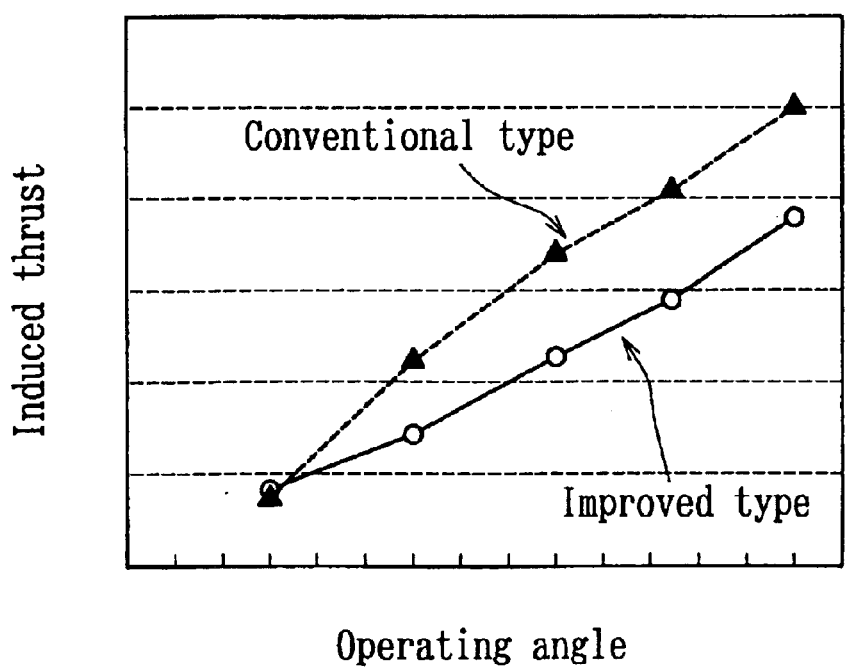
FIG. 8 is a characteristics diagram showing the relationship of induced thrust relative to operating angle presented in the embodiment in FIG. 6.

In the embodiments shown in FIG. 6 and FIG. 7, as shown in FIG. 8, when a conventional type and a improved type (in accordance with the embodiments) are compared, the improved type has less induced thrust than the conventional type even with a higher operating angle so that the improved type can be used for vehicles operating at higher angles.

Figure 9:
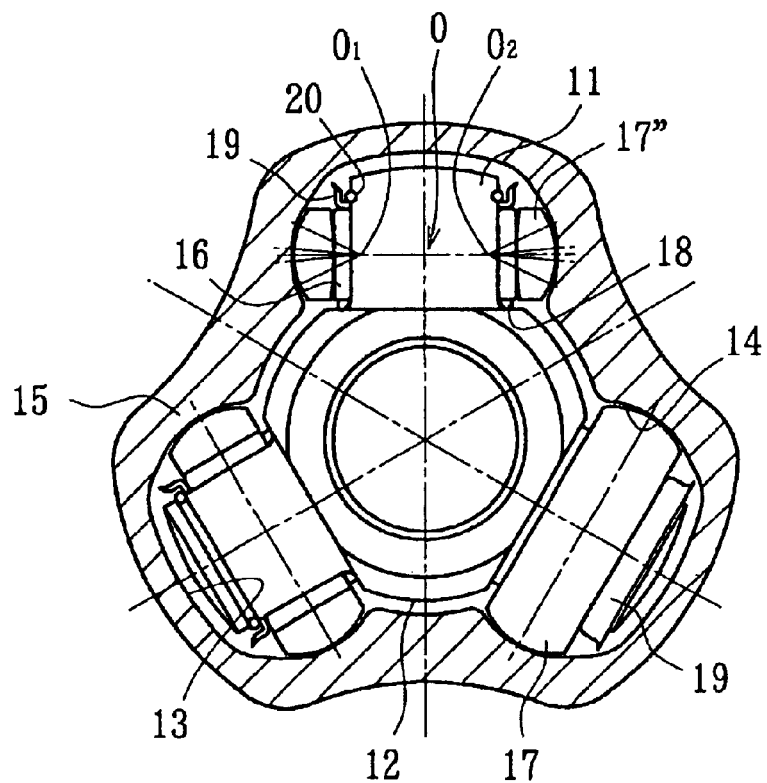
FIG. 9 is still another embodiment of the present invention, showing a tripod type constant velocity universal joint, wherein the outer circumferential surface of a roller in cross section forms an arc shape with the center of curvature shifted radially outward from the axis of the roller.
Figure 10:
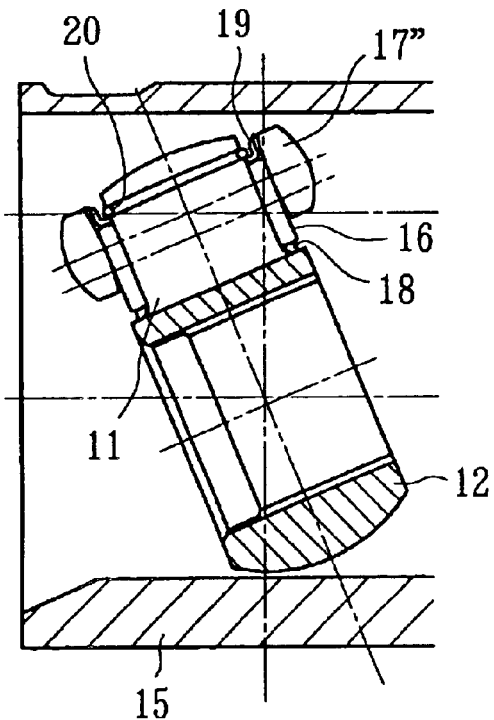
FIG. 10 is a cross sectional side view of the tripod type constant velocity universal joint in the embodiment in FIG. 9, showing a state in which the roller is inclined in the axial direction of an outer joint member.
Figure 11:
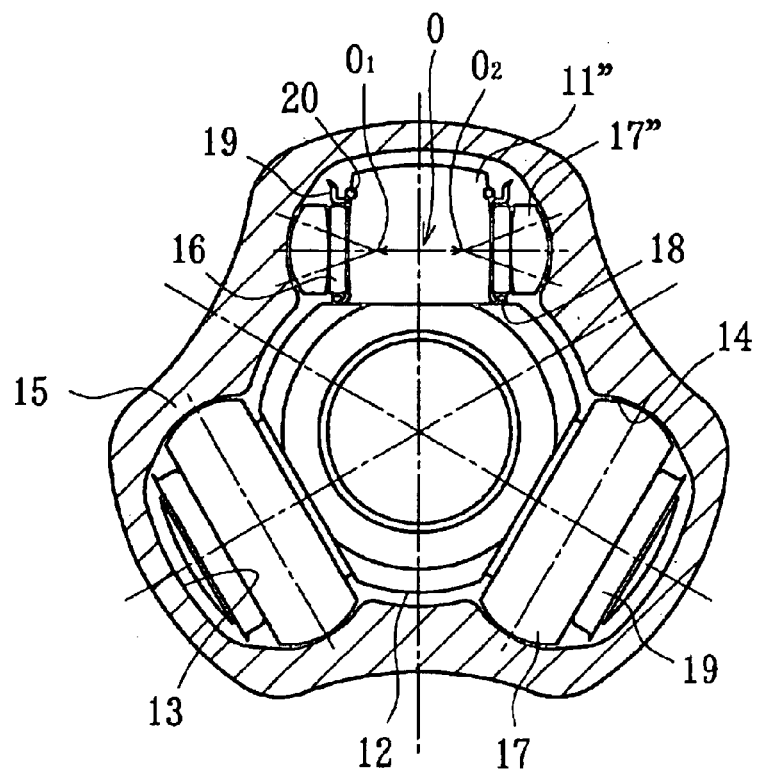
FIG. 11 is a further embodiment of the present invention showing a cross sectional view of a tripod type constant speed universal joint, in which the outer circumferential surface of the roller in cross section forms an arc shape with the center of curvature thereof shifted radially outward from the axis of the roller, the outer circumferential surface is formed in an elliptical cylinder, and the outer circumferential surface of the leg shaft and inner circumferential surface of the roller are crowned.
Figure 12:
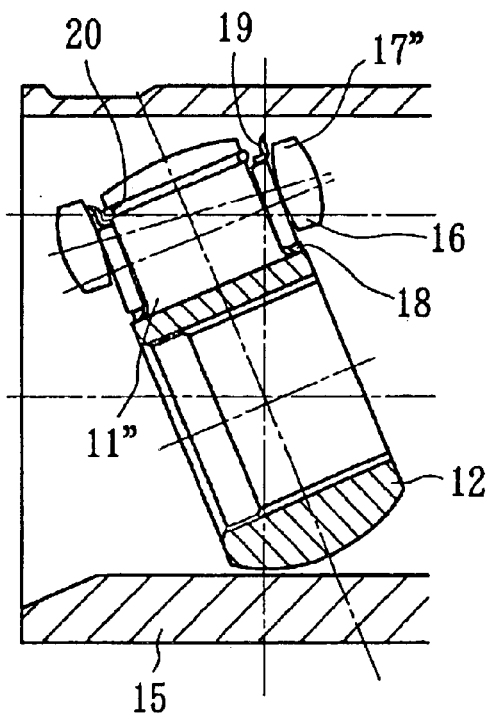
FIG. 12 is a cross sectional side view of the tripod type constant velocity universal joint in the embodiment in FIG. 11, showing a state in which the roller is inclined in the axial direction of an outer joint member.
Figure 13:
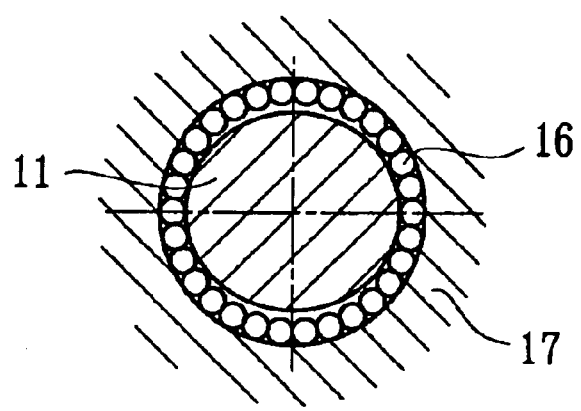
FIG. 13 is an enlarged cross sectional view of an essential part showing the leg shaft, the outer surface of which forms an elliptical cylinder, the needle rollers, and the inner surface of the roller of the embodiment shown in FIG. 11.

FIG. 9 and FIG. 10 show an embodiment in which the outer circumferential surface of a roller 17" in cross section forms an arc shape and the centers of curvature $O_1$ and $O_2$ are shifted radially outward from an axis O of the roller 17". FIGS. 11 to 13 show an embodiment in which the outer circumferential surface of roller 17" in cross section forms an arc shape with the centers of curvature $O_1$ and $O_2$ shifted radially outward from the axis O of the roller, and furthermore, the outer surface of the leg shaft 11' in cross section forms an elliptical cylinder. The outer circumferential surface of the leg shaft 11' and the inner circumferential surface of the roller 17" are crowned.

In the tripod type constant velocity universal joint of this embodiment, by forming the roller 17" with the outer circumferential surface in an arc cross section with the centers of curvature $O_1$ and $O_2$ shifted radially, outward from the axis O of the roller, the force suppressing the inclination of the roller 17" is increased. This means that the roller 17" is in parallel with the track groove 13 as much as possible when it moves, with a reduced inclination, even when there is an operating angle, and as a result the level of vibration can be reduced.

Making the leg shaft 11' in an elliptical cylinder and crowning the outer circumferential surface of the leg shaft 11' and the inner circumferential surface of the roller 17", enables a swinging motion of the roller 17" on the leg shaft 11' in the axial direction of the leg shaft. Thereby, the roller 17" is in parallel with track groove 13 as much as possible when it moves, with a reduced inclination, even when there is an operating angle, and as a result the level of vibration can be further reduced.

When the roller 17" is inclined in the axial direction of the leg shaft 11", a contact angle between the roller 17" and the roller guide surface 14 varies and a track clearance becomes smaller. Therefore, it is preferable that, like this embodiment, the outer circumferential surface of the roller 17" in cross section forms an arc shape with the centers of curvature $O_1$ and $O_2$ of the outer circumferential surface shifted radially outward from the axis O of the roller. At the same time, the roller guide surface 14 is formed in a shape in which a track clearance can be secured between the track groove 13 and the roller guide surface 14 even when the roller 17" is inclined at a maximum operating angle.

By doing this, freedom of movement of the roller 17" relative to the roller guide surface 14 is increased and the level of vibration is further reduced.

Figure 14:
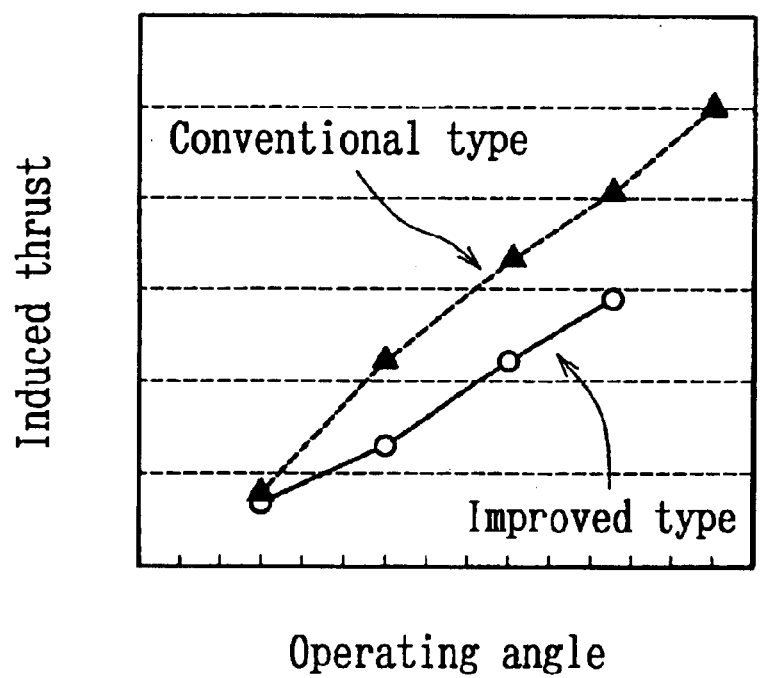
FIG. 14 is a characteristics diagram showing the relationship between the induced thrust and the operating angle in the embodiments of FIG.9 and FIG. 10, and FIG. 11 to FIG. 13.
Figure 15:
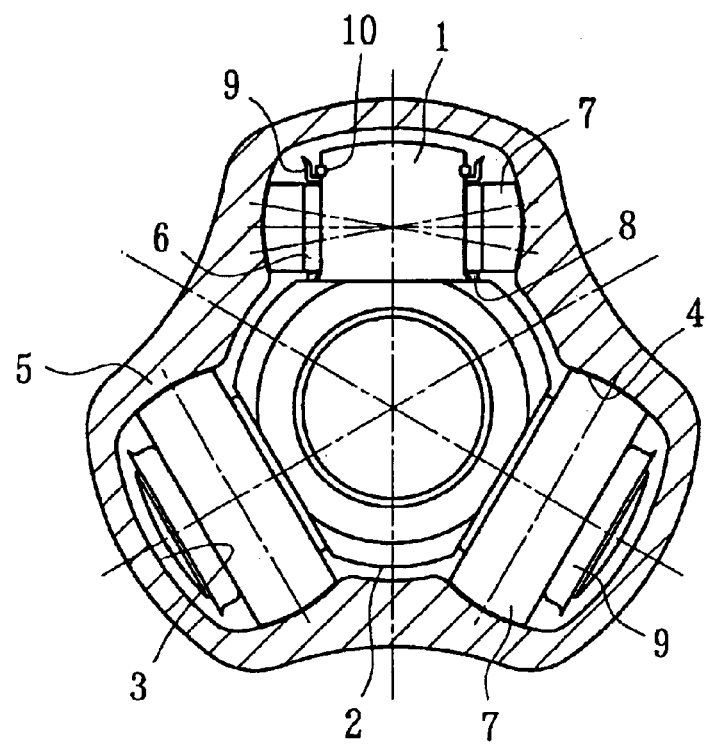
FIG. 15 is a cross sectional view showing a conventional tripod type constant velocity universal joint.
Figure 16:
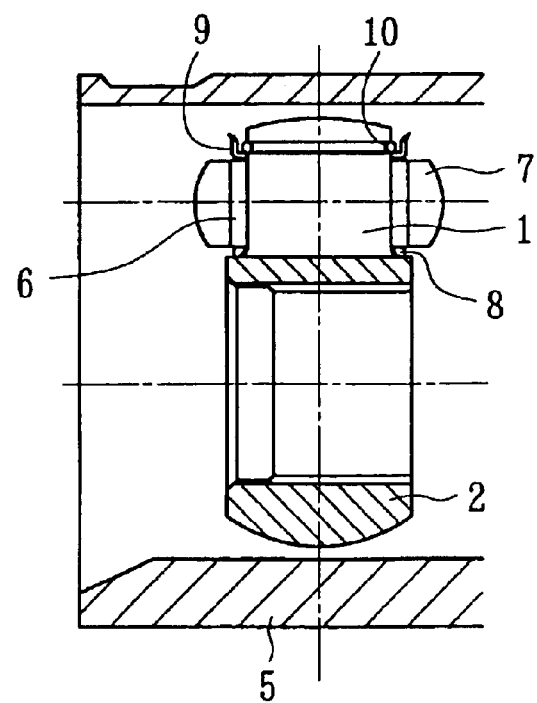
FIG. 16 is a cross sectional side view of the conventional tripod type constant velocity universal joint presented in FIG. 15.
Figure 17:
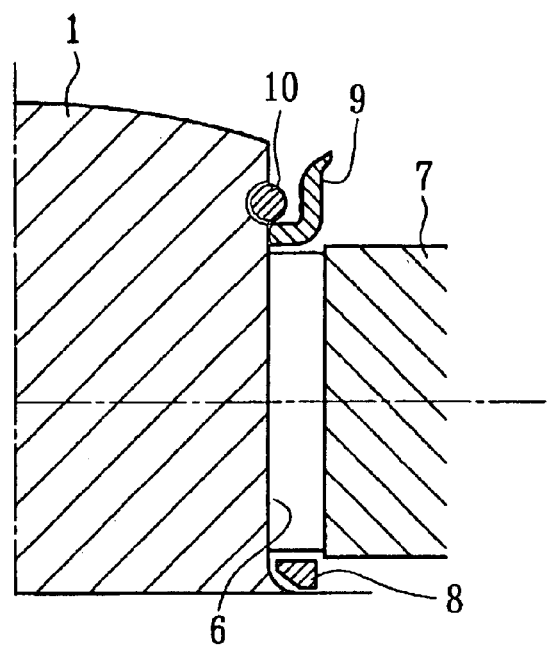
FIG. 17 is an enlarged cross sectional view of an essential part of the conventional tripod type constant velocity universal joint in FIG. 15, showing a leg shaft, a needle roller, and a roller.
Figure 18:
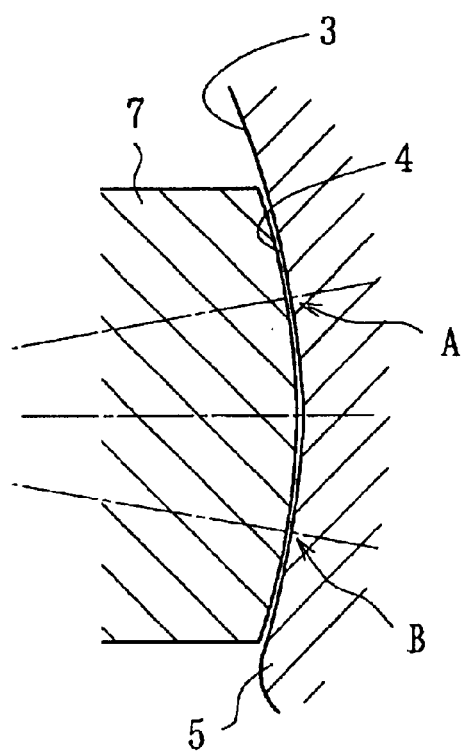
FIG. 18 is an enlarged cross sectional view of an essential part of the conventional tripod type constant velocity universal joint in FIG. 15, showing a roller and a roller guide surface.

In the embodiment shown in FIG. 9 and FIG. 10, and the embodiment in FIG. 11 to 13, when a conventional type and improved types (in accordance with the embodiments) are compared as shown in FIG. 14, the improved types have less induced thrust than the conventional type even at larger operating angles so that the improved types can be used for vehicles operating at higher angles.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A tripod type constant velocity universal joint comprising:
   an outer joint member having three track grooves extending in its axial direction of the outer joint member and on an inner circumference surface of the outer joint member;
   a tripod member having three radially projecting leg shafts around a circumference of the tripod member; and
   rotatable rollers mounted on each leg shaft through a plurality of needle rollers and positioned in the track grooves of the outer joint member,
   wherein outer circumferential surfaces of the rollers are guided by roller guide surfaces provided on both sides of the track grooves,
   wherein grooves are provided on the roller guide surfaces at a pair of contact points where the rollers contact the roller guide surfaces and extend in a direction orthogonal relative to a longitudinal axis of each rotatable roller, and
   wherein the contact points are disposed intermediate the outer circumferential surfaces of the rollers.

2. The tripod type constant velocity universal joint according to claim 1, wherein at least one additional groove is provided on the roller guide surfaces between the pair of contact points where the rollers contact the roller guide surfaces.

3. The tripod type constant velocity universal joint according to claim 1 or claim 2, wherein the outer circumferential surface of the roller is formed in a spherical shape, and the outer circumferential surface of the roller in cross section forms an arc shape with its center of curvature shifted radially outward from the axis of the roller.

4. The tripod type constant velocity universal joint according to claim 1 or 2, wherein there are dual angular contact points between the roller guide surface and the roller.

5. The tripod type constant velocity universal joint according to claim 2, wherein the outer circumferential surface of the leg shaft is crowned and a ratio R/d of the crowning R to an outer diameter d of the leg shaft is in a range of 5.0 to 39.3.

6. The tripod type constant velocity universal joint according to claim 2, wherein the inner circumferential surface of the roller is crowned and a ratio R/D of the crowning R to an inner diameter D of the roller shaft is in a range of 2.2 to 35.2.

7. The tripod type constant velocity universal joint according to claim 1 or 2, wherein the outer circumference of the leg shaft is formed in an elliptical cylinder.

8. The tripod type constant velocity universal joint according to claim 1 or 2, wherein the surfaces of the ends of the needle rollers are formed in a convex shape.

9. The tripod constant velocity universal joint according to claim 1 or 2, wherein the grooves provided on the roller guide surfaces define pockets for grease supplied inside the constant velocity universal joint.

10. A tripod type constant velocity universal joint comprising:

an outer joint member having three track grooves extending in an axial direction of the outer joint member and on an inner circumference surface of the outer joint member;

a tripod member having three radially projecting leg shafts around a circumference of the tripod member; and rotatable rollers mounted on each leg shaft through a plurality of needle rollers and positioned in the track grooves of the outer joint member, wherein outer circumferential surfaces of the rollers are guided by roller guide surfaces provided on both sides of the track grooves, and wherein grooves are provided on the roller guide surfaces at a pair of contact points where the rollers contact the roller guide surfaces and extend in a direction orthogonal relative to a longitudinal axis of each rotatable roller, wherein the outer circumferential surface of the leg shaft is crowned and a ratio R/d of the crowning R to an outer diameter d of the leg shaft is in a range of 5.0 to 39.3.

11. The tripod type constant velocity universal joint according to claim 10, wherein the outer circumferential surface of the roller is formed in a spherical shape, and the outer circumferential surface of the roller in cross section forms an arc shape with its center of curvature shifted radially outward from the axis of the roller.

12. The tripod type constant velocity universal joint according to claim 10, wherein there are dual angular contact points between the roller guide surface and the roller.

13. The tripod type constant velocity universal joint according to claim 10, wherein the inner circumferential surface of the roller is crowned and a ratio R/D of the crowning R to an inner diameter D of the roller shaft is in a range of 2.2 to 35.2.

14. The tripod type constant velocity universal joint according to claim 10, wherein the outer circumference of the leg shaft is formed in an elliptical cylinder.

15. The tripod type constant velocity universal joint according to claim 10, wherein the surfaces of the ends of the needle rollers are formed in a convex shape.

16. The tripod constant velocity universal joint according to claim 10, wherein the grooves provided on the roller guide surfaces define pockets for grease supplied inside the constant velocity universal joint.

17. A tripod type constant velocity universal joint comprising:

an outer joint member having three track grooves extending in an axial direction of the outer joint member and on an inner circumference surface of the outer joint member;

a tripod member having three radially projecting leg shafts around a circumference of the tripod member; and rotatable rollers mounted on each leg shaft through a plurality of needle rollers and positioned in the track grooves of the outer joint member, wherein outer circumferential surfaces of the rollers are guided by roller guide surfaces provided on both sides of the track grooves, and wherein grooves are provided on the roller guide surfaces at a pair of contact points where the rollers contact the roller guide surfaces and extend in a direction orthogonal relative to a longitudinal axis of each rotatable roller, wherein the inner circumferential surface of the roller is crowned and a ratio R/D of the crowning R to an inner diameter D of the roller shaft is in a range of 2.2 to 35.2.

18. The tripod type constant velocity universal joint according to claim 17, wherein the outer circumferential surface of the roller is formed in a spherical shape, and the outer circumferential surface of the roller in cross section forms an arc shape with its center of curvature shifted radially outward from the axis of the roller.

19. The tripod type constant velocity universal joint according to claim 17, wherein there are dual angular contact points between the roller guide surface and the roller.

20. The tripod type constant velocity universal joint according to claim 17, wherein the outer circumference of the leg shaft is formed in an elliptical cylinder.

21. The tripod type constant velocity universal joint according to claim 17, wherein the surfaces of the ends of the needle rollers are formed in a convex shape.

22. The tripod constant velocity universal joint according to claim 17, wherein the grooves provided on the roller guide surfaces define pockets for grease supplied inside the constant velocity universal joint.

* * * * *